(12) United States Patent
Lee

(10) Patent No.: US 6,208,862 B1
(45) Date of Patent: Mar. 27, 2001

(54) METHOD OF REALIZING HARD HANDOFF BETWEEN FA IN CDMA MOBILE COMMUNICATION SYSTEM

(75) Inventor: Hyo Jin Lee, Seoul (KR)

(73) Assignee: LG Telecom, Ltd., Seoul (KR)

( * ) Notice: Subject to any disclaimer, the term of this patent is extended or adjusted under 35 U.S.C. 154(b) by 0 days.

(21) Appl. No.: 09/213,412

(22) Filed: Dec. 17, 1998

(30) Foreign Application Priority Data

Sep. 8, 1998 (KR) .................................................. 98-37033

(51) Int. Cl.[7] ....................................................... H04Q 7/20
(52) U.S. Cl. ............................ 455/442; 455/436; 370/331
(58) Field of Search .................................. 455/436, 444; 370/331, 332, 334, 204, 320

(56) References Cited

U.S. PATENT DOCUMENTS

| | | | |
|---|---|---|---|
| 5,594,718 | * | 1/1997 | Weaver, Jr. et al. ................. 370/331 |
| 5,790,528 | * | 8/1998 | Muszynski ........................... 455/442 |
| 5,926,470 | * | 7/1999 | Tiedemann, Jr. .................... 370/334 |
| 5,999,816 | * | 1/1999 | Tiedemann, Jr. et al. ........... 455/437 |
| 6,038,450 | * | 3/2000 | Brink et al. .......................... 455/442 |

* cited by examiner

Primary Examiner—Nguyen T. Vo
Assistant Examiner—Duc Nguyen
(74) Attorney, Agent, or Firm—Fleshner & Kim, LLP

(57) ABSTRACT

A method of realizing hard handoff between frequency assignments in a mobile communication system is disclosed. The method is capable of building and managing base stations having different FA while significantly reducing the probability of call drops during hard handoff between FA, such that the call capacity can be increased. The method of realizing hard handoff between different FA includes the steps of setting guard sectors among sectors of a plurality of base stations, allowing a mobile station to transmit a message which requests handoff at a boundary area between the base stations to a base station currently in service, implementing soft handoff between the base stations, and implementing hard handoff between FA after implementing the soft handoff.

10 Claims, 3 Drawing Sheets

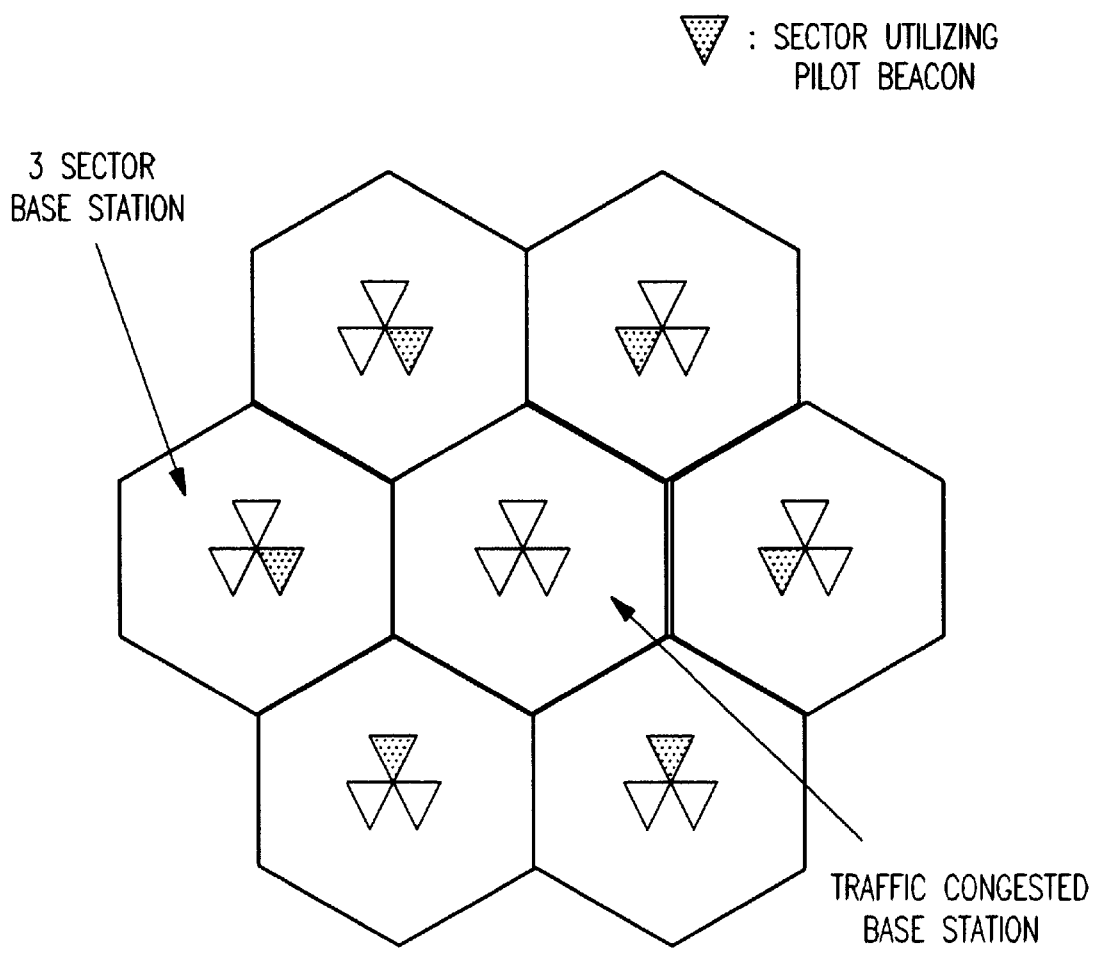

METHOD OF REALIZING HARD HANDOFF BETWEEN FA IN CDMA MOBILE COMMUNICATION SYSTEM

BACKGROUND OF THE INVENTION

1. Field of the Invention

The present invention relates to a method of realizing hard handoff between frequency assignments (FA), and more particularly to a method of realizing hard handoff between FA in a code division multiple access (CDMA) mobile communication system.

2. Background of the Related Art

Generally, in a CDMA mobile communication, all base stations share the same frequency and each base stations has sectors utilizing an independent PN offset. Also, the probability of call drops for a mobile station which moves between the base stations having different FA is relatively high. Thus, the CDMA mobile communication allows a number of respective base stations to have the same number of FA within overlapping zones of operation in which the mobility of a mobile station is frequent.

When a mobile station moves from one base station to another, a handoff allows a continual communication by switching radio lines to connect speech paths between the base stations. Thus, a communication network can be constructed using a limited frequency resource thereby increasing the frequency efficiency. Particularly, there are three types of handoff, soft, hard handoff and idle.

A soft handoff occurs when a mobile station moves from one base station to another base station wherein the base stations have a common FA. In the soft handoff, a communication with a new base station begins before communication with a base station currently in service ends. FIG. 1*a* shows a soft handoff between Base Station A and Base Station B. A mobile station moving from Base Station A to B simultaneously communicates with both Base Station A and B within a boundary area joining the operation zones of the base stations. If the mobile station continues to move from Base Station A to B. the signal from Base Station A to the mobile station becomes too weak for an effective communication. Thus, the mobile station ends communication with Base Station A and begins communication only with Base Station B, which also ends the handoff procedure.

A hard handoff occurs when a mobile station moves from one base station to another wherein the base stations have different FA. In the hard handoff, a communication with a new base station ends before communication with a base station currently in service starts. FIG. 1*b* shows the hard handoff between Base station A and Base Station B. A mobile station moving from Base Station A to B ends communication with Base Station A at the boundary area joining the operation zones of Base Station A and B. Afterwards, the mobile station begins to communicate with Base Station B which ends the handoff procedure. Because the signals of corresponding base stations are weak at the boundary area between the base stations, the probability of call drop is high during the hard handoff. Accordingly, the mobile station communicates with a new base station after ending communication with the previous base station.

An idle handoff occurs while the mobile station is in a standby mode, whereupon the mobile station is not actively communicating with a base station. In the idle handoff, the mobile station receives from the base station an overhead channel which includes a pilot channel, a synchronizing channel, and a paging channel. The mobile station also receives a system parameter or paging from the overhead channels to realize the idle handoff. If the mobile station moves within the boundary area where a number of different FA are utilized, the mobile station stays synchronized to the current FA until the mobile station receives information for the new list of FA. Unless the mobile loses synchronization to the current FA, the boundary area remains as an uncompleted service area.

Moreover, for the standard IS-95 of a CDMA cellular system or the standard J-STD-008 of CDMA PCS systems, the frequency band of 1.25 MHZ is utilized as one FA. One FA is utilized in one sector of a base station allowing simultaneous communication by 15 to 30 mobile stations. Also, a number of FA are commonly utilized by all base stations within a designated area and additional FA may be utilized in response to a traffic load. When a mobile station moves within base stations having the same FA, the soft handoff is possible. However, the hard handoff is performed rather than a soft handoff when a mobile station moves between base stations having different FA.

Furthermore, subscribers in downtown areas are high causing a high traffic load. To accommodate the high number of subscribers and Lo increase the traffic load capacity, macro-cell base stations or micro-cell base stations are additionally built in a traffic congestion area. It is preferable to build a micro-cell base station because the service coverage of an additional base station should be limited in the traffic congestion area.

If building additional base stations is difficult, the subscriber capacity can be increased by increasing the number of FA for all the stations in the same zone of operation. However, the amount of overloaded base stations having a traffic load greater than the service capacity is relatively low in downtown or university towns. On the contrary, most of the base stations have a traffic load smaller than the service capacity. Therefore, an overall increase of the FA number for all the base stations in the same zone of operation is uneconomical.

FIG. 2 shows the configuration of sectors in base stations in the related art with Pilot Beacon which assists the hard handoff between base stations having different FA. As shown, in a CDMA mobile communication system with base stations consisting of three interconnected sectors, there are traffic congested base station and neighboring base stations. The traffic congested base station utilizes both the common FA shared with the neighboring base stations and additional FA, while the neighboring base stations utilizes only the commaon FA shared with the traffic congested base station.

Moreover, among the sectors of the neighboring base stations, the sectors adjacent to the traffic congested base station are set as sectors which utilize the pilot beacon. For example, if the traffic congested base station utilizes a first and a second FA, and if a neighboring base station utilizes a third FA, a boundary sector among the sectors in the neighboring base station utilizing a portion of FA common to the traffic congested base station is set as the sector utilizing the pilot beacon.

The pilot beacon was suggested by Qualcomm of the United States to manage the pilot beacon by mounting an overhead channel in different FA, i.e. the additional FA, rather than the commonly utilized FA. Also, excluding a traffic channel, the overhead channel includes a pilot channel, a synchronizing channel and a paging channel.

If the mobile station moves from an area with a large number of FA to an area with a small number of FA and if the area with a large number of FA is utilizing an additional FA, the mobile station within the boundary area transmits a pilot strength measurement message (PSMM) requesting a handoff procedure to a base station currently in service. In response, the hard handoff is implemented by the common FA at the boundary area of the base station currently in service. Subsequently, the mobile station implements a soft handoff to a neighboring base station.

Meanwhile, to enable the idle handoff, the mobile station is tuned to the common FA by receiving a global service redirection message (GSRM) in a paging channel of FA corresponding to the pilot beacon. Afterwards, a new FA among a number of common FA is computed through a CDMA channel list message so that the mobile station is retuned to the final FA.

The method hard handoff procedure as describe above has several problems. Since the hard handoff between FA is implemented in the boundary area between the base stations whose signals are weak, the probability of message loss is high causing a high probability of call drops. In addition, since the soft handoff is implemented utilizing the common FA immediately after the hard handoff is implemented to the common FA in the base station, the common FA in a overloaded sector has a more serious overload than the additional FA, thereby causing a traffic inbalance among the common FA and additional FA.

SUMMARY OF THE INVENTION

Accordingly, an object of the present invention is to solve at least the problems and disadvantages of the related art.

An object of the present invention is to provide a method of realizing hard handoff between FA capable of building and managing base stations having different FA.

Another object of the present invention is to provide a method of realizing hard handoff which significantly reduces the probability of call drops.

A further object of the present invention is to provide a method of realizing hard handoff which increases the traffic load capacity.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method of realizing hard handoff between different FA according to the present invention includes the steps of setting guard sectors among sectors of a plurality of base stations, allowing a mobile station to transmit a message which requests handoff at a boundary area between the base stations to a base station currently in service, implementing soft handoff between the base stations, and implementing hard handoff between FA after implementing the soft handoff.

BRIEF DESCRIPTION OF THE DRAWINGS

The invention will be described in detail with reference to the following drawings in which like reference numerals refer to like elements wherein:

FIG. 2 shows the configuration of sectors in base stations in the related art with Pilot Beacons.

DETAILED DESCRIPTION OF THE PREFERRED EMBODIMENTS

Figure 1A:
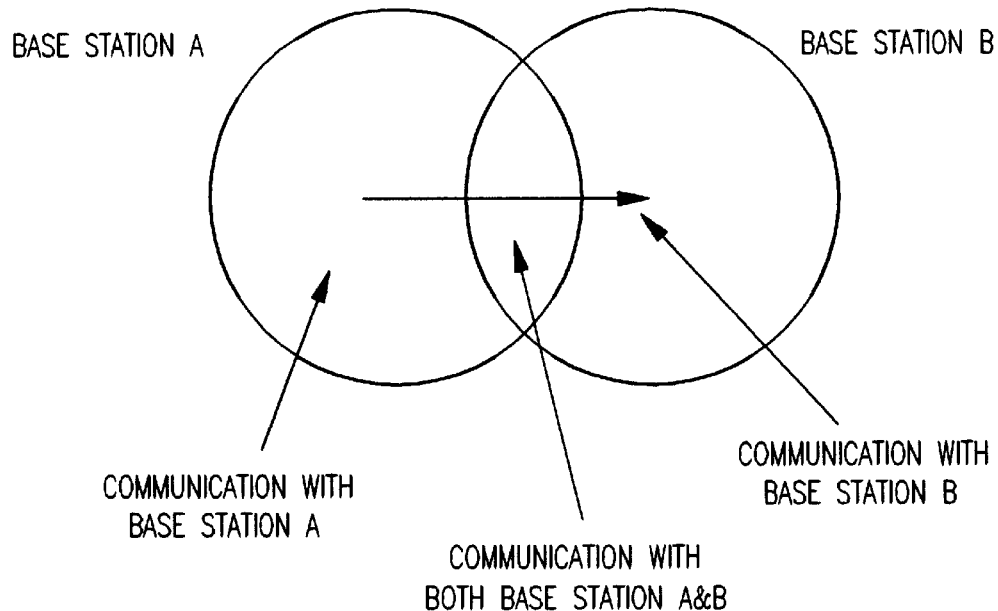
FIG. 1a shows a soft handoff.
Figure 1B:
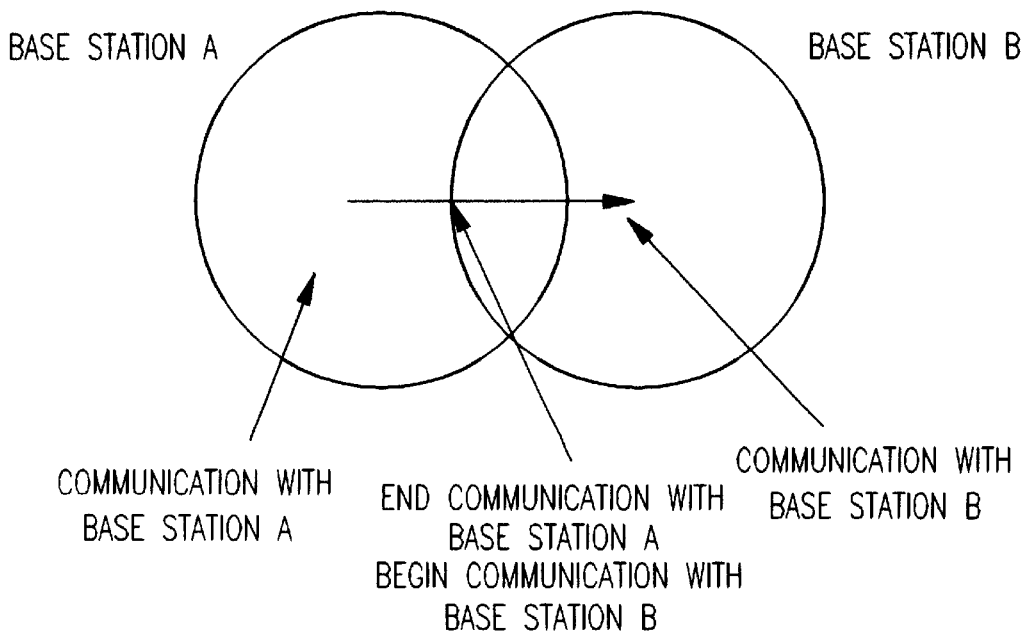
FIG. 1b shows a hard handoff.
Figure 3:
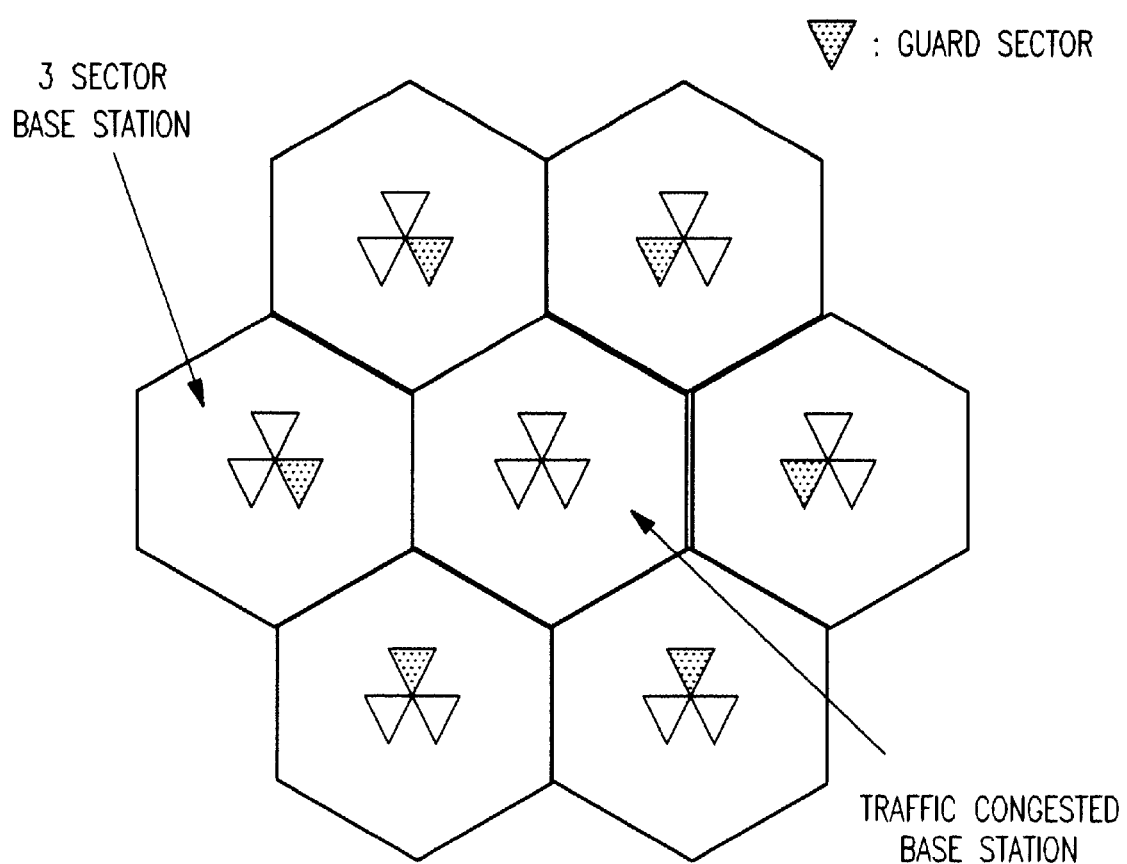
FIG. 3 shows the configuration of sectors in base stations according to the present invention with guard sectors.

Reference will now be made in detail to the preferred embodiment of the present invention, example of which is illustrated in FIG. 3.

Referring to FIG. 3, the preferred embodiment of a communication network according to the present invention includes a plurality of base stations each with three interconnected sectors. Similar to the configuration as described with respect to FIG. 2, a traffic congested base station utilizes both a common FA and an additional FA while the neighboring base stations utilize a different neighboring FA. Among the sectors of the plurality of base stations having different FA, the boundary sectors of the base stations utilizing a less number of FA are selected as guard sectors.

Unlike the pilot beacon, the guard sectors are managed by mounting both an overhead channel and a traffic channel in the additional FA. With both the overhead channel and the traffic channel information, a soft handoff can be performed between two base stations within the guard sectors. Also, as in the method of utilizing the pilot beacon, the guard sectors set the additional FA in a Neighboring Database List as "pilot beacon=1."

When the mobile station utilizing an additional FA moves from an area with a large number of FA to an area with a smaller number of FA, the mobile station receives a pilot channel of the guard sectors within the boundary area between the base station. After receiving the pilot channel, the mobile station within the boundary area transmits a PSMM requesting a handoff procedure to a base station currently in service. In response, a soft handoff between the base station currently in service and the base station into which the mobile station will move is implemented referring to the PSMM. Thereafter, a hard handoff is implemented by the base station which the mobile station will move into.

During the handoff procedure, the T_ADD value for determining a start of the soft handoff and the T_DROP value for determining an end of the soft handoff are greater than the T_ADD value and the T_DROP values of the sectors neighboring the guard sectors. This minimizes the number of the sectors involved in the soft handoff. The number of sectors involved in the handoff is reduced as much as possible because the guard sectors are not highly affected by noise of the neighboring base station around the additional FA.

As a result, the soft handoff between the base stations is implemented before implementing the hard handoff between the FA because the guard sectors are managed in such a manner that both the overhead channel and the traffic channel are mounted in the additional FA, thereby supporting the soft handoff utilizing the additional FA. Subsequently, as the mobile station moves into the guard sector, if the communication is maintained by the guard sectors, i.e. if all the Active PN Set of "KEEP=1" in the PSMM is "pilot beacon=1," the hard handoff between the FA of the base stations is implemented using the most powerful signal of the guard sectors. Furthermore, the hard handoff between FA is implemented inside the guard sectors rather than the boundary area between the base stations.

Therefore, since the hard handoff is implemented in an area where the signal is stable, the probability of a message loss is lowered and the probability of call drop is significantly lowered. Finally, in the same manner as the method of utilizing the pilot beacon, the idle handoff is implemented by tuning the mobile station to the common FA using a GSRM in a paging channel of the additional FA of the guard sectors. Afterwards, the mobile station is retuned to the new FA by computing a new FA through a CDMA channel list message.

As aforementioned, the method of realizing the hard handoff between different FA according to the present invention has the following advantages. Since the hard handoff between FA is not implemented in the boundary area between the base stations whose signals are weak but is implemented inside the guard sectors whose signals are powerful and stable, the probability of call drop is significantly reduced. In addition, since the hard handoff between different FA is implemented after implementing the soft handoff between the base stations, the traffic congested base station has the same load between the common FA and the additional FA, such that the overall system acquires a stable characteristic.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of realizing hard handoff comprising:
   setting guard sectors selected among boundary sectors of base stations utilizing a less number of frequency assignment (FA) than non-selected neighboring sectors of other base stations;
   implementing hard handoff inside the guard sectors;
   allowing a mobile station to transmit a message which requests handoff at a boundary area between the base stations to a base station which is currently in service;
   implementing soft handoff between the base stations; and
   implementing the hard handoff between FA after completing the soft handoff.

2. The method of claim 1, wherein in the setting the guard sectors, the boundary sectors of the base stations utilizing only a common FA are set as the guard sectors.

3. The method of claim 1, further comprising the step of managing the guard sectors by mounting an overhead channel in an additional FA.

4. The method of claim 1, wherein in the implementing soft handoff between the base stations, a T_ADD value for determining the start of the soft handoff and a T_DROP value for determining the end of the soft handoff in an additional FA of the guard sectors are greater than T_ADD value and T_DROP value in sectors neighboring the guard sectors.

5. A method of realizing hard handoff comprising:
   setting guard sectors for a first base station currently serving a mobile station, wherein the guard sectors are selected among neighboring sectors of base stations;
   allowing a mobile station to transmit a message requesting handoff from the first base station to a target base station of the base stations;
   implementing soft handoff between the first base station and the target base station using the guard sectors;
   implementing a hard handoff between frequency assignment (FA) using the guard sectors after completing the soft handoff; and
   managing the guard sectors by mounting an overhead channel and a traffic channel in an additional FA.

6. The method of claim 5, wherein the first base station uses a first FA and the additional FA, and wherein in the setting the guard sectors, the neighboring sectors of the base stations utilizing a fewer number of FA are set as the guard sectors.

7. The method of claim 5, wherein in the implementing soft handoff between the base stations, a T_ADD value for determining the start of the soft handoff and a T_DROP value for determining the end of the soft handoff in the additional FA of the guard sectors are greater than T_ADD value and T_DROP value in sectors neighboring the guard sectors.

8. A method of realizing hard handoff comprising:
   setting guard sectors selected among neighboring sectors of base stations that are adjacent to a first base station, wherein setting the guard sectors, the neighboring sectors using a fewer number of frequency assignment (FA) are set as the guard sectors;
   implementing hard handoff inside the guard sectors;
   allowing a mobile station to transmit a message requesting handoff from the first base station to a target base station using a selected guard sector;
   implementing soft handoff between the first base station and the target base station using the selected guard sector; and
   implementing the hard handoff between FA in using the selected guard sector after completing the soft handoff.

9. The method of claim 5, further comprising managing the guard sectors by mounting an overhead channel and a traffic channel in an additional FA, wherein the first base station uses a first FA and the additional FA, and wherein in the setting the guard sectors, the neighboring sectors of the base stations utilizing the first FA are set as the guard sectors.

10. The method of claim 9, wherein in the implementing soft handoff between the base stations, a T_ADD value for determining the start of the soft handoff and a T_DROP value for determining the end of the soft handoff in the additional FA of the guard sectors are greater than T_ADD value and T_DROP value in sectors neighboring the guard sectors.

* * * * *